(12) United States Patent
Dellac et al.

(10) Patent No.: US 7,865,289 B2
(45) Date of Patent: Jan. 4, 2011

(54) METHOD OF DISTRIBUTING BRAKING BETWEEN THE BRAKES OF AN AIRCRAFT

(75) Inventors: Stéphane Dellac, Tournefeuille (FR); Arnaud Jacquet, Clamart (FR); Gérard Léon Gissinger, Balschwiller (FR); Michel Basset, Heimsbrunn (FR); Yann Chamaillard, Le Bardon (FR); Jean-Pierre Garcia, Colomiers (FR)

(73) Assignee: Messier-Bugatti, Velizy Villacoublay (FR)

( * ) Notice: Subject to any disclaimer, the term of this patent is extended or adjusted under 35 U.S.C. 154(b) by 171 days.

(21) Appl. No.: 12/282,533

(22) PCT Filed: Mar. 13, 2007

(86) PCT No.: PCT/FR2007/000437
§ 371 (c)(1),
(2), (4) Date: Feb. 9, 2009

(87) PCT Pub. No.: WO2007/104862
PCT Pub. Date: Sep. 20, 2007

(65) Prior Publication Data
US 2009/0210126 A1    Aug. 20, 2009

(30) Foreign Application Priority Data
Mar. 13, 2006 (FR) ................... 06 02183

(51) Int. Cl.
*G06G 7/00* (2006.01)
(52) U.S. Cl. .......... 701/70; 701/3; 701/7; 303/126; 303/164; 303/167; 244/111

(58) Field of Classification Search ................... 701/3, 701/7, 70; 303/164–167, 126; 244/111
See application file for complete search history.

(56) References Cited

U.S. PATENT DOCUMENTS 4,367,529 A * 1/1983 Masclet et al. ............... 701/79

(Continued)

FOREIGN PATENT DOCUMENTS

EP        227574 A1 * 12/1986

(Continued)

OTHER PUBLICATIONS

Stabilization of Automotive Vehicles Using Active Steering and Adaptive Brake Control Allocation; Tjonnas, J. et al.; Control Systems Technology, IEEE Transactions on; vol. 18 , Issue: 3; Digital Object Identifier: 10.1109/TCST.2009.2023981 Publication Year: 2010 , pp. 545-558.*

(Continued)

*Primary Examiner*—Cuong H Nguyen
(74) *Attorney, Agent, or Firm*—Sughrue Mion, PLLC

(57) ABSTRACT

A method of distribution braking between the brakes of an aircraft. The method includes a first step of estimating a braking force objective and a steering torque objective to be achieved by the brakes of the aircraft. It also includes the steps of defining at least two groups of brakes (12, 13) and determining, for each group, a braking level that is to be achieved by the group. The braking levels being calculated in such a manner that braking performed in application of the braking levels is, at least under normal operating conditions of the brakes, in compliance with a braking force objective and with a steering torque objective.

5 Claims, 2 Drawing Sheets

U.S. PATENT DOCUMENTS

| | | | |
|---|---|---|---|
| 5,390,990 A * | 2/1995 | Cook et al. | 303/132 |
| 5,507,568 A * | 4/1996 | Cook et al. | 303/135 |
| 5,630,490 A * | 5/1997 | Hudson et al. | 192/223.3 |
| 5,785,158 A * | 7/1998 | Grimm | 188/181 T |
| 6,890,041 B1 * | 5/2005 | Ribbens et al. | 303/126 |
| 6,916,075 B2 * | 7/2005 | Salamat et al. | 303/112 |
| 2004/0189084 A1 * | 9/2004 | Salamat et al. | 303/112 |
| 2005/0231030 A1 | 10/2005 | Frank | |
| 2005/0231031 A1 | 10/2005 | Bellouard et al. | |
| 2007/0132311 A1 * | 6/2007 | Giazotto | 303/126 |
| 2008/0033607 A1 * | 2/2008 | Zeliff et al. | 701/29 |
| 2009/0206654 A1 * | 8/2009 | Colin | 303/121 |
| 2009/0210126 A1 * | 8/2009 | Dellac et al. | 701/70 |
| 2009/0250308 A1 * | 10/2009 | Hadley | 192/223.2 |

FOREIGN PATENT DOCUMENTS

| | | | |
|---|---|---|---|
| EP | 727594 A2 * | 8/1996 | |
| EP | 2090480 A1 * | 8/2009 | |
| EP | 2107265 A1 * | 10/2009 | |
| GB | 1 585 321 A | 2/1981 | |
| GB | 2411934 A * | 9/2005 | |
| WO | WO 0136240 A1 * | 5/2001 | |
| WO | 2005/087563 A1 | 9/2005 | |
| WO | WO 2007104862 A1 * | 9/2007 | |

OTHER PUBLICATIONS

Tire-road forces estimation based on sliding mode observer; Hongyan Guo et al.; Mechatronics and Automation, 2009. ICMA 2009. International Conference on; Digital Object Identifier: 10.1109/ICMA.2009.5244813; Publication Year: 2009 , pp. 4577-4582.*

Study on fail-safe strategy of electric power steering system; Lianbing Li et al.; Mechatronics and Automation, 2009. ICMA 2009. International Conference on; Digital Object Identifier: 10.1109/ICMA.2009.5246451; Publication Year: 2009 , pp. 4775-4779.*

Vehicle Lateral Stability Control Based on Sliding Mode Control ; Shuen Zhao et al.; Automation and Logistics, 2007 IEEE International Conference on; Digital Object Identifier: 10.1109/ICAL.2007.4338642; Publication Year: 2007 , pp. 638-642.*

Robust Force Control of an SRM-Based Electromechanical Brake and Experimental Results; Krishnamurthy, P. et al.; Control Systems Technology, IEEE Transactions on; vol. 17 , Issue: 6; Digital Object Identifier: 10.1109/TCST.2008.2006908 Publication Year: 2009 , pp. 1306-1317.*

Dynamic balance control of humanoids for multiple grasps and non coplanar frictional contacts; Collette, C. et al.; Humanoid Robots, 2007 7th IEEE-RAS International Conference on; Digital Object Identifier: 10.1109/ICHR.2007.4813852 Publication Year: 2007 , pp. 81-88.*

Tire-road forces estimation based on sliding mode observer ; Hongyan Guo; et al. ; Mechatronics and Automation, 2009. ICMA 2009. International Conference on; Digital Object Identifier: 10.1109/ICMA.2009.5244813; Publication Year: 2009 , pp. 4577-4582.*

Control of a class of thrust-propelled underactuated vehicles and application to a VTOL drone; Minh-Duc Hua et al.; Robotics and Automation, 2009. ICRA '09. IEEE International Conference on; Digital Object Identifier: 10.1109/ROBOT.2009.5152210 Publication Year: 2009 , pp. 972-978.*

Research on Modeling and Simulation of Aircraft Taxiing Rectification; Li Bo et al.; Robotics, Automation and Mechatronics, 2006 IEEE Conference on; Digital Object Identifier: 10.1109/RAMECH.2006.252621; Publication Year: 2006 , pp. 1-5.*

* cited by examiner

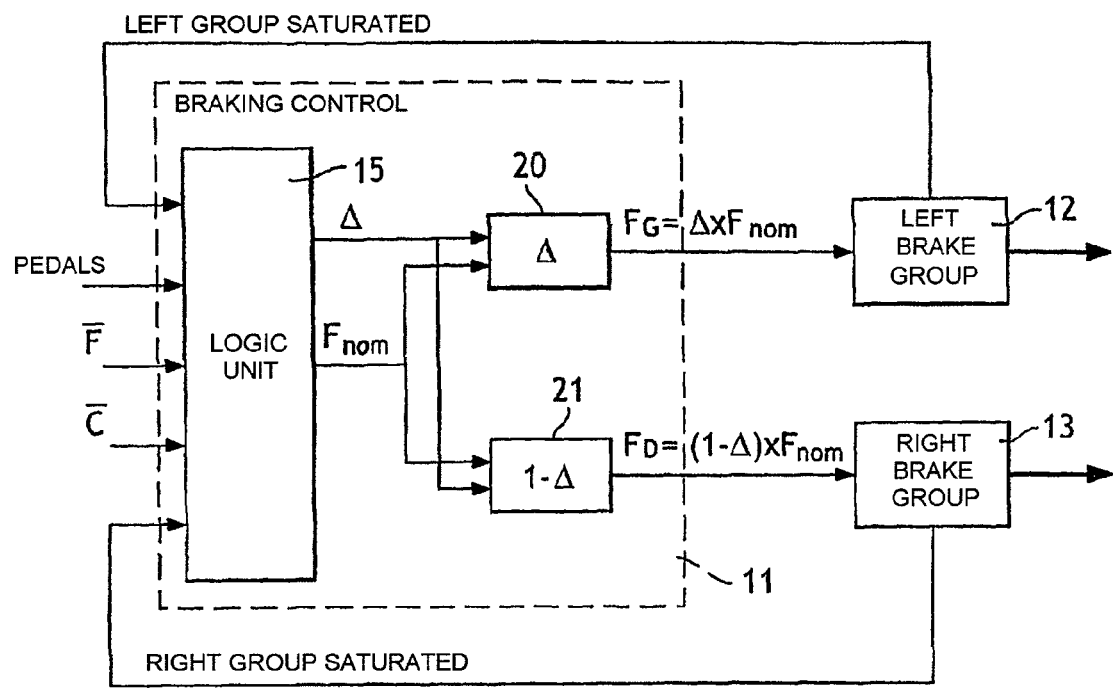
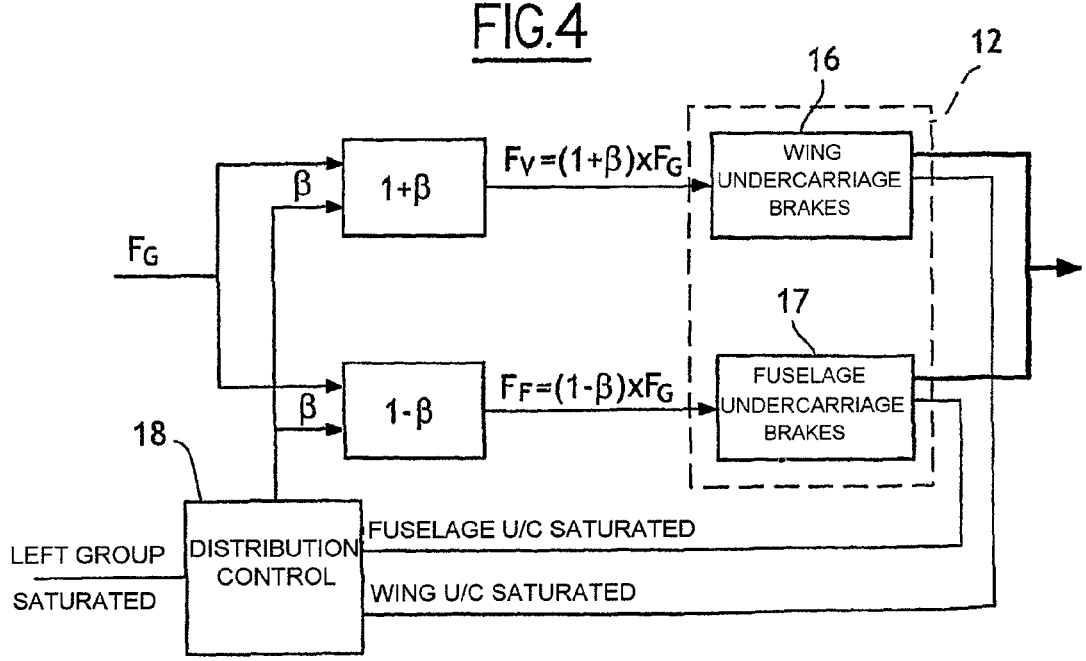

METHOD OF DISTRIBUTING BRAKING BETWEEN THE BRAKES OF AN AIRCRAFT

The invention relates to a method of distributing braking between the brakes of an aircraft.

BACKGROUND OF THE INVENTION

Aircraft of a certain size are generally fitted with a braking computer that generates a braking force objective in response either to the pilot depressing the brake pedals, or in response to the pilot selecting a determined level of deceleration ("autobrake" function). In practice, the braking force objective is implemented by sending braking setpoints to the power drive members associated with the brakes, the setpoints being identical for all of the brakes and being such that the sum of the braking forces developed by the brakes in response to the braking setpoints achieves the braking force objective.

OBJECT OF THE INVENTION

An object of the invention is to provide a distribution method that enables the use of the brakes to be optimized.

BRIEF DESCRIPTION OF THE INVENTION

In order to achieve this object, the invention provides a method of distributing braking between the brakes of an aircraft, the method comprising the steps of:

estimating a braking force objective and a steering torque objective to be achieved by the brakes of the aircraft;

defining at least two groups of brakes; and calculating, for each group, a braking level that is to be achieved by said group, said braking levels being calculated in such a manner that braking performed in application of said braking levels is, at least under normal operating conditions of the brakes, in compliance with the braking force objective and with the steering torque objective.

Thus, the brakes are used for slowing down the aircraft, and also for assisting it in turning. The setpoint for the brakes of one group can then be different from the setpoints for the brakes of the other group.

In a preferred implementation, braking levels are determined that maximize the greatest simultaneous level of satisfaction concerning the braking objective and the steering torque objective.

Advantageously, the brakes are distributed between at least a left group and a right group that are symmetrical to each other. Under such circumstances, the steering torque objective is preferably specified by a difference between the braking force to be achieved by the left group and a braking force to be achieved by the right group.

Preferably, the braking force objective or the steering torque objective are estimated while taking account of action by members of the aircraft other than the brakes and capable of influencing the path followed by the aircraft.

BRIEF DESCRIPTION OF THE DRAWINGS

The invention can be better understood in the light of the following description with reference to the figures of the accompanying drawings, in which:

FIG. 3 is a view showing a detail of FIG. 2, illustrating how braking is controlled; and FIG. 4 is a block diagram of a distribution within a single group, that is adaptable to the control illustrated by FIG. 3.

DETAILED DESCRIPTION OF THE INVENTION

Figure 1:
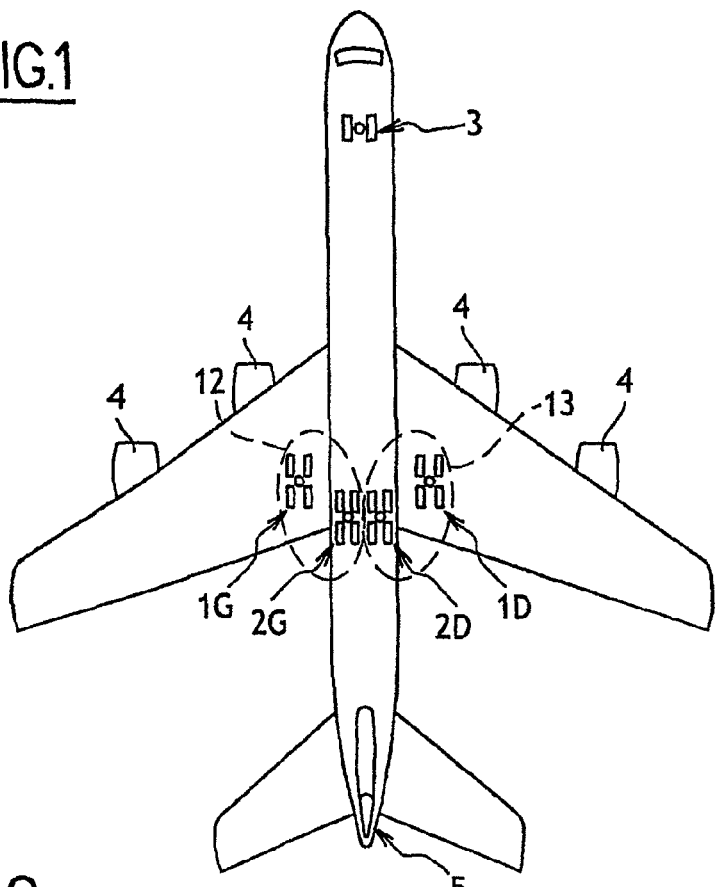
FIG. 1 is a diagrammatic view of an aircraft having four main undercarriages with braked wheels.

The invention is illustrated herein with reference to an aircraft of the kind shown in FIG. 1, having two main wing undercarriages 1G and 1D, two main fuselage undercarriages 2G and 2D, and a nose undercarriage 3 with steerable wheels. Each of the main undercarriages 1G, 1D, 2G, 2D has four wheels equipped with respective brakes. The aircraft is also fitted with engines 4, and with a rudder 5.

Figure 2:
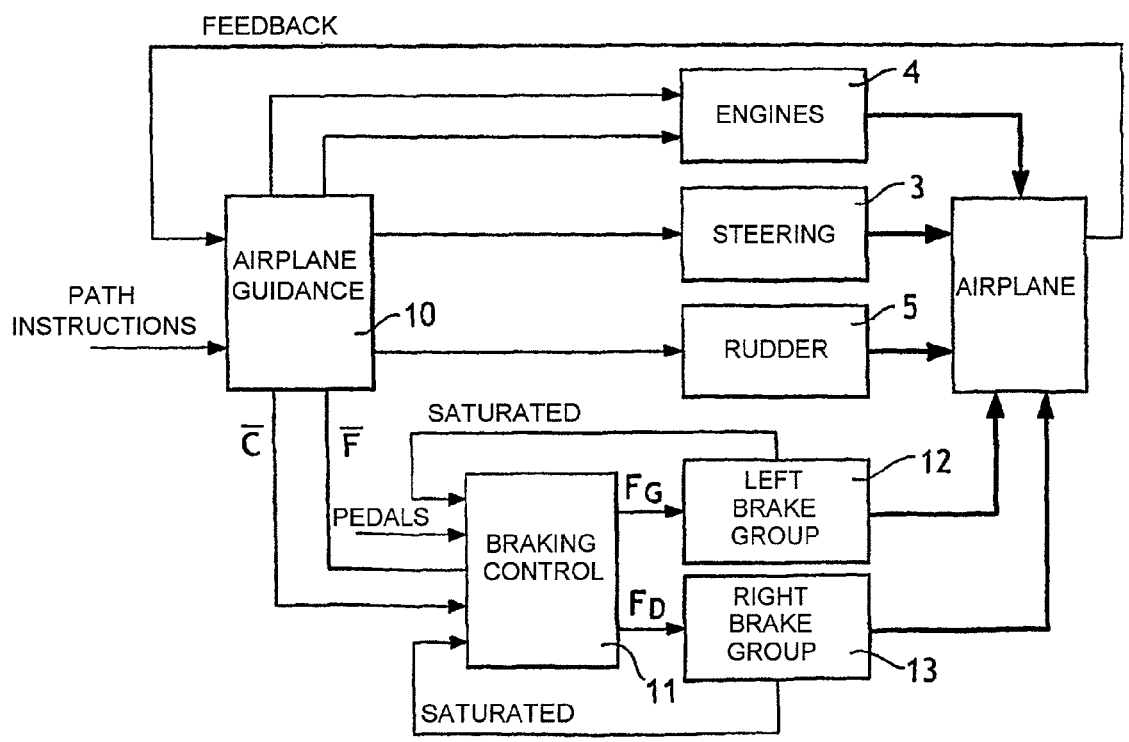
FIG. 2 is a block diagram of a ground-guidance architecture for the FIG. 1 aircraft in a particular implementation of the invention.

The invention applies to a ground-guidance architecture for the aircraft shown in FIG. 2 that includes an aircraft guide module 10. The guide module 10 receives as input a path setpoint (which may, where appropriate be rectilinear) and it controls all of the members that can have an influence on the path followed by the aircraft on the ground, i.e. the engines 4, the steering of the wheels of the nose undercarriage 3, the rudder 5, and naturally the brakes of the main undercarriages.

The guide module 10 generates orders for the engines 4, for the rudder 5, and for controlling the steering of the wheels of the nose undercarriage 3, and by taking the difference between the path setpoint and the effects expected of the actions carried out by the above-mentioned members in response to said orders it deduces a braking objective $\overline{F}$ and a steering torque objective $\overline{C}$ to be achieved by the brakes.

The path setpoint may present various forms:

in a pure braking mode, e.g. on landing, the path setpoint consists in specifying to the guide module 10 at least one given deceleration rate and a zero turning rate; and in a ground taxiing mode, e.g. between the runway and the terminal, the path setpoint consists in specifying to the guide module 10 at least one turning rate that varies at all times to follow a determined path.

The braking objective $\overline{F}$ determined from the path setpoint, itself represents a setpoint, i.e. how a braking force that the brakes are to develop should vary over time in order to cause the aircraft to follow the path with a given movement (position, speed, acceleration). In practice, the braking force objective represents one or more applications of the brakes of determined duration and intensity. Each application of the brakes can be associated with a total amount of energy to be dissipated by all of the brakes of the aircraft, obtained by integrating the braking force objective over time.

Similarly, the steering torque objective $\overline{C}$ also represents a setpoint, i.e. the variations over time in the steering torque that the brakes need to develop for the aircraft to follow the path in application of a given movement (position, speed, acceleration). Steering torque may be necessary, for example, in order to brake the aircraft while turning.

The brakes are controlled by a braking control module 11 that receives from the guide module 10 both the braking force objective $\overline{F}$ and the steering torque objective $\overline{C}$ to be implemented by the brakes.

Starting from the braking force objective $\overline{F}$ and the steering torque objective $\overline{C}$, the braking control module 11 generates two braking levels Fg and Fd destined respectively:

for a left brake group 12 grouping together the brakes carried by the left wing main undercarriage 1G and the left fuselage main undercarriage 2G; and a right brake group 13 grouping together the brakes carried by the right wing main undercarriage 1D and the right fuselage main undercarriage 2D.

Dashed lines in FIG. 1 show how the left and right groups 12 and 13 are made up. It can be seen that the left and right groups 12 and 13 are symmetrical.

According to the invention, the braking levels Fg and Fd are determined so that their sum is equal to the braking objective $\overline{F}$ and their steering effect on the aircraft is equal to the steering torque objective $\overline{C}$.

In practice, in such a configuration, the steering torque objective $\overline{C}$ can be specified by a difference between the force to be developed by one of the groups and the force to be developed by the other group.

Nevertheless, satisfying the braking objective $\overline{F}$ and the steering torque objective $\overline{C}$ assumes that the brakes have sufficient capacity to satisfy both objectives simultaneously, as is indeed true under the normal operating conditions of the brakes.

Nevertheless, under certain circumstances (wet runway, faulty brakes), it can happen that one or more of the brakes can generate only a limited braking force, preventing the braking objective $\overline{F}$ or the steering torque objective $\overline{C}$ being achieved. Under such circumstances, a saturation signal is sent by the group in question to the braking control module 11, which takes this saturation into account in order to generate braking levels Fg and Fd that come as close as possible to the required objectives $\overline{F}$, $\overline{C}$, given the braking capacity that is available.

In a particular implementation, the braking control module 11 is programmed to organize the objectives hierarchically, for example it may give priority to achieving the braking objective $\overline{F}$ over achieving the steering torque objective $\overline{C}$. Under such circumstances, the braking control module 11 generates braking levels Fg, Fd that are adapted to satisfy the braking objective $\overline{F}$, but having an effect on steering torque that merely comes as close as possible to the steering objective $\overline{C}$, given the capacities of the brakes. More generally, braking levels Fg, Fd are sought that maximize a simultaneous satisfaction level for both objectives $\overline{F}$ and $\overline{C}$ while taking account of any limitations of one or more brakes.

In a variant, the pilot might be given an option to give greater weight to one or the other of the objectives $\overline{F}$ and $\overline{C}$.

While braking is being applied in compliance with the braking levels Fg and Fd as determined in this way, the left brake group 12 and the right brake group 13 act mechanically on the path followed by the aircraft as represented by bold arrows, as do the engines 4, the steerable wheels of the nose undercarriage 3, and the rudder 5, with the actions of all these members having an influence on the path followed by the aircraft.

Measurements of magnitudes that are representative of the path, such as speed, longitudinal acceleration, or angular acceleration, are then delivered to the guide module 10 in order to form a feedback loop.

The braking control module 11 is described below in greater detail with reference to FIG. 3.

The braking control module 11 has a logic unit 15 programmed to respond to the required braking objective $\overline{F}$ and steering torque objective $\overline{C}$, to generate a nominal force setpoint Fnom and a left/right distribution setpoint Δ by means of which a first modulator 20 generates the braking level Fg for the left brake group 12 and a second modulator 21 generates the braking level Fd for the right brake group. In practice, the braking level Fg is obtained by obtaining the product Δ×Fnom, and the braking level Fd is obtained by obtaining the product (1−Δ)×Fnom. The logic unit 15 is programmed so that in the event of one or other of the brake groups saturating, it modulates the nominal force setpoint Fnom and the distribution setpoint Δ so as to come as close as possible to the objectives $\overline{F}$ and $\overline{C}$, given the available braking capacity.

Thus, by the distribution performed in accordance with the invention, the brakes enable a braking force and a steering torque to be exerted on the aircraft. It should be observed that the distribution implemented in this way is not frozen but varies over time.

Knowing the braking level of a group makes it possible to estimate the energy that is to be dissipated by the brakes of that group, by integrating its braking level over time.

The principle of grouping brakes in accordance with the invention can be taken to a higher level by distinguishing subgroups within a group. For example, in the left group, and as shown in FIG. 4, it is possible to distinguish a first subgroup 16 made up of the brakes fitted to the left wing main undercarriage 1G, and a second subgroup 17 made up of the brakes fitted to the left fuselage main undercarriage 2G.

The braking level Fg is subdivided into two braking sublevels Fv and Ff for those two subgroups 16 and 17 respectively by means of a distribution control module 18 that generates a distribution coefficient β which is used to obtain the products $$Fv=(1+\beta)\times Fg$$

and $$Ff=(1-\beta)\times Fg.$$

By construction, the sum of the braking sublevels Fv and Fb is equal to the braking level Fg. The distribution control module 18 takes account of the saturation signals coming respectively from the brakes of the first subgroup 16 and from the brakes of the second subgroup 17 in order to calculate the distribution coefficient β. Thus, if the brakes of one of the subgroups saturate, it is possible to divert the braking force onto the brakes of the other subgroup. If this diversion does not suffice for achieving the left braking setpoint Fg, the distribution control module 18 generates a saturation signal for the left brake group 12.

In order to achieve the level of braking intended for one of the brake groups (or subgroups), it is appropriate for all of the brakes of the group to generate individual braking forces such that the resultant of the individual braking forces developed by each of the brakes reaches the required braking level.

In a first procedure, it is ensured that the individual braking forces are identical for all of the brakes of the group. This is the simplest procedure.

In a second procedure that is particularly advantageous, the various individual braking forces are determined so as to satisfy a given operating criterion, while complying with a required braking level, and naturally while taking account of the available braking capacity.

In a first implementation, the operating criterion retained is minimizing the wear suffered by the friction elements of the brakes in the group. It is known that carbon friction elements present a wear rate that depends on the temperature of the friction elements. If $\Delta T_k$ is the increase in the temperature of brake k during the forthcoming braking, then the wear on brake k is given by:

$$U_k = \int_{T_k}^{T_k + \Delta T_k} \tau(T) dT$$

where $\tau$ is the wear rate that depends in particular on temperature.

In order to calculate the rise in temperature $\Delta T_k$ of the brake k, a thermal model of the brake is used that calculates the rise in temperature $\Delta T_k$ as a function of the energy $\Delta E_k$ dissipated by the brake. Ignoring the natural cooling of the brake (which is valid for braking durations that are short and brake temperatures that are low), it is possible to associate the increase in temperature $\Delta T_k$ of the brake k with the energy $\Delta E_k$ to be dissipated by the brake during the forthcoming braking by using the following model:

$$\Delta E_k = \int_{T_k}^{T_k + \Delta T_k} M_k C_p dT_k$$

where $M_k$ is the mass of the friction elements of the brake k, which is assumed to be constant during the braking, and $C_p$ is the thermal capacity of the material constituting the friction elements of the brake k.

The total energy $\Delta E$ to be dissipated by the brakes of the group is naturally equal to the sum of the amounts of energy dissipated by each of the brakes. The total energy to be dissipated by the brakes is given by integrating over time the braking force objective of the group, as mentioned above.

Thus, minimizing wear amounts to seeking for each of the brakes of the group, an amount of energy $\Delta E_k$ to be dissipated that minimize the quantity:

$$\sum_k U_k$$

under the constraint:

$$\Delta E = \sum_k \Delta E_k$$

From the amounts of energy $\Delta E_k$ to be dissipated by each of the brakes in the group, individual setpoints are deduced for the braking force $F_i$ to be developed by each of the brakes.

Wear minimization can be obtained by any known optimization technique. In a preferred implementation of the invention, a certain number of arbitrary distributions of energy between the brakes of the group are retained. In practice, each distribution is represented by a list of coefficients (as many coefficients as there are brakes in the group) with the sum of the coefficients in each list being equal to 1.

For example, if the group has two brakes, then the following distributions could be considered:
$R^1 = \{1; 0\}$, $R^2 = \{0.7; 0.3\}$, $R^3 = \{0.5; 0.5\}$, $R^4 = \{0.3; 0.7\}$, and $R^5 = \{0; 1\}$ Minimization consists in calculating for each arbitrary distribution $R^i$ the corresponding energies $\Delta E_k^i$ for each of the brakes, and then the wear $U_k^i$ of each of the brakes produced by dissipating the corresponding energy. The total wear:

$$U^i = \sum_k U_k^i$$

is the sum of the amounts of wear calculated in this way. The arbitrary distribution $R^i$ that gives the smallest total wear $U^i$ is then retained.

Wear minimization as described above thus applies to all of the brakes in a given group. It is possible to apply this operating criterion to each of the groups of brakes so as to minimize friction element wear on a group-by-group basis. Nevertheless, as is well known, minimizing wear on a group-by-group basis can lead to a result that is not optimum from the point of view of all of the brakes of the aircraft.

It is thus advantageous, in accordance with the invention, for the wear minimization operating criterion to be generalized so as to apply to all of the brakes of the aircraft simultaneously, while still complying, for each group, with the required braking force level. A search is thus made for the distribution over all of the brakes that minimizes overall wear, while ensuring that each group complies with the required braking force level.

Also advantageously, the wear minimization operating criterion is generalized in accordance with the invention not only for all of the brakes for a given application of the brakes, but also for all of the applications of the brakes that are to be expected along the path. To do this, it is appropriate in advance to determine the expected braking operations and thus to determine the amount of energy that will be dissipated by each of the groups of brakes, which makes it necessary to know the entire path that the aircraft is likely to follow on the airport.

This knowledge can be obtained either by storing the possible path(s) on the airport in a memory, or by a statistical study applied to a typical path for such and such an airport, specifying the mean number of applications of the brakes and the mean intensity thereof.

Over the expected path, the movement (position, speed, acceleration) of the aircraft is determined along said path, and the braking and steering torque objectives and the energy to be dissipated by the brakes are deduced therefrom.

There follows a detailed description relating more particularly to the manner in which the invention makes it possible to handle situations in which one or more brakes become saturated. Such situations can arise if the grip of a tire on the ground falls off suddenly, for example on passing over a zone that is wet or icy. It is then not possible simultaneously to satisfy the braking force objective $\overline{F}$ and the torque objective $\overline{C}$.

According to the invention, the objectives are ordered hierarchically, which amounts to defining two strategies:

1) so long as the detected saturation continues, precedence is temporarily given to the steering torque objective $\overline{C}$, while forgoing any attempt at reaching the braking force objective $\overline{F}$; this strategy is particularly well adapted to situations in which the stopping distance available in front of the aircraft is quite sufficient, should that become necessary. This ensures that the aircraft remains on the desired path, even if it is not possible, momentarily, to ensure its motion characteristics (in particular speed) along said path. In particular, while landing, this strategy enables the pilot to keep the aircraft on the axis of the runway, at the cost of possibly lengthening the braking distance; or 2) so long as the detected saturation continues, precedence is temporarily given to the braking force objective $\overline{F}$, while forgoing any attempt at reaching the steering torque objective $\overline{C}$. This strategy is more particularly suitable for situations in which it is necessary to be able to stop quickly under all circumstances. Thus, the pilot can stop the airplane over the shortest distance compatible with the available braking capacity, at the cost of possibly departing from the intended path.

Naturally, it is also possible to define intermediate strategies, in which the two objectives are weighted.

In order to implement these strategies, and in one particular implementation, a first step is to determine the nominal force level for the right group Fdn and the nominal force level for the left group Fgn that would enable both the steering torque objective $\overline{C}$ and the braking force objective $\overline{F}$ to be satisfied, assuming there was no saturation.

It is assumed here that the left group is saturating such that the maximum braking force level it can deliver is equal to Fgsat. To implement the first strategy, i.e. to give priority to the steering torque objective $\overline{C}$, it is ensured that the difference $\Delta F$ between the force level developed by the left group and the force level developed by the right group is equal to:

$\Delta F = Fgn - Fdn$

This amounts to ensuring that the steering torque that is developed is equal to the steering torque objective $\overline{C}$ that the brakes would normally be capable of developing in the absence of saturation.

Under such conditions, the force level imposed on the left group is equal to:

$Fg = \min(Fgn, Fgsat)$

It can thus be deduced that the force level required of the right group is equal to:

$Fd = Fg - \Delta F$

If the left nominal force level Fgn is less than the saturation force Fgsat of the left group, then Fg=Fgn and Fd=Fg−ΔF=Fdn. The steering torque objective is then also satisfied. It is only when the left nominal force level Fgn exceeds the saturation force Fgsat for the left group that the steering torque objective cannot be reached.

Implementing this strategy when the right group saturates is similar. It continues to be the difference between the force levels of the left group and the right group that is required and it is set equal to:

$\Delta F = (Fgn - Fdn)$

However this time it is the force level of the right group that might be limited:

$Fd = \min(Fgn, Fdsat)$

The force level of the left group can then be deduced as follows:

$Fd = Fd + \Delta F$

Now if both groups saturate, then it is appropriate to distinguish between the left nominal force level Fgn being greater than or smaller than the right nominal force level Fdn:

If Fgn>Fdn, then Fg=min(Fg,Fgn) and Fd=Fg−ΔF;
If Fgn<Fdn, then Fd=min(Fd,Fdn) and Fg=Fd+ΔF;

where the difference $\Delta F$ is always required and is equal to $\Delta F = Fgn - Fdn$.

Naturally, situations can arise in which both groups saturate to such an extent that the steering torque objective cannot be complied with. Under such circumstances, precedence continues to be given to satisfying the steering torque $\overline{C}$, by approaching it as closely as possible.

For implementing the second strategy that consists in giving precedence to achieving the braking force objective $\overline{F}$, it is then required that the sum ΣF of the left force level Fg plus the right force level Fd is equal to:

$\Sigma F = Fgn + Fdn$ which amounts to requiring that the force generated by all of the brakes continues to be equal to the braking force objective $\overline{F}$.

When it is the left group that saturates, then:

$Fg = \min(Fgn, Fgsat)$ and $Fd = \Sigma F - Fg$

When it is the right group that saturates, then:

$Fd = \min(Fdn, Fdsat)$ and $Fg = \Sigma F - Fd$

Finally, when both groups of brake saturate, the maximum force that can be developed by all of the brakes is Fmax=Fgsat+Fdsat. If ΣF<Fmax then it continues to be possible to reach the braking objective. However, if ΣF<Fmax, then the braking force objective $\overline{F}$ can no longer be achieved. Attempts are then made to satisfy it as well as possible, causing the brakes to brake at their maximum capacity, given the saturation.

Which distribution strategy is selected is preferably left to the pilot. However, in a variant, the strategy may be selected automatically by a path-tracking computer. Under such circumstances, the pilot is preferably informed that one of the groups of brakes has reached saturation.

The invention is not limited to the above description, but on the contrary covers any variant coming within the ambit defined by the claims.

In particular, the distribution of braking in accordance with the invention remains compatible with implementing anti-slip protection for each of the braked wheels.

Although it is stated that a braking force objective $\overline{F}$ and a steering torque objective $\overline{C}$ are established, the invention also covers the situation where only one of those objectives is established, for example the braking force objective $\overline{F}$. Under those circumstances, it suffices to set the steering torque objective $\overline{C}$ arbitrarily to zero.

Although it is stated that the operating criterion retained for applying braking is minimizing the wear of the friction elements, other operating criteria could be retained. For example, it is possible to select as the operating criterion making a search for the distribution that leads to braking force being applied as smoothly as possible so as to improve passenger comfort or so as to preserve the components of the aircraft that are subjected directly to braking force (undercarriages, the undercarriage to airframe connections, the associated tires, . . . ). For the brakes, it is also possible to minimize the number of times the brakes are actuated so as to increase brake lifetime, or to minimize the amplitudes of the forces to be applied.

Finally, although the brakes are described as being subdivided into a left group and a right group, this distribution is not limiting, and the brakes could be distributed in some other way, for example:

a left group made up of the left wing undercarriage brakes;
a right group made up of the right wing undercarriage brakes; and
a central group made up of the fuselage undercarriage brakes.

The distribution of brakes within groups is not necessarily determined once and for all, and it may be varied within the ambit of the invention.

Naturally, the invention does not apply solely to the particular configuration shown herein comprising two main wing undercarriages and two main fuselage undercarriages, but it applies to any configuration of undercarriages having brakes.

The invention also naturally applies equally well regardless of whether the brakes are actuated hydraulically, electromechanically, or using any other technology.

What is claimed is:

1. A method of distribution braking between the brakes of an aircraft, the method comprising the steps of:
    estimating a braking force objective ($\overline{F}$) and a steering torque objective ($\overline{C}$) to be achieved by the brakes of the aircraft;
    defining at least two groups of brakes (12, 13); and
    determining, for each group, a braking level (Fg, Fd) that is to be achieved by said group, said braking levels being calculated in such a manner that braking performed in application of said braking levels is, at least under normal operating conditions of the brakes, in compliance with the braking force objective and with the steering torque objective.

2. A method according to claim 1, in which the braking levels are determined that maximize the greatest simultaneous level of satisfaction concerning the braking objective and the steering torque objective.

3. A method according to claim 1, in which the brakes are distributed between at least a left group (12) and a right group (13) that are symmetrical to each other.

4. A method according to claim 3, in which the steering torque objective ($\overline{C}$) is specified by a difference between the braking force to be achieved by the left group (12) and a braking force to be achieved by the right group (13).

5. A method according to claim 1, in which the braking force objective ($\overline{F}$) or the steering torque objective ($\overline{C}$) are estimated while taking account of action by members of the aircraft (3, 4, 5) other than the brakes and capable of influencing the path followed by the aircraft.

* * * * *